US012803877B2

(12) United States Patent
Che et al.

(10) Patent No.: US 12,803,877 B2
(45) Date of Patent: Nov. 17, 2026

(54) NETWORK TOPOLOGY DISCOVERY SYSTEM, METHOD, APPARATUS, AND STORAGE MEDIUM

(71) Applicant: HUAWEI TECHNOLOGIES CO., LTD., Shenzhen (CN)

(72) Inventors: Jia Che, Beijing (CN); Zhaojiao Han, Shenzhen (CN); Pengfei Shao, Xi'an (CN); Weijun Lu, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 212 days.

(21) Appl. No.: 18/755,820

(22) Filed: Jun. 27, 2024

(65) Prior Publication Data

US 2024/0348505 A1 Oct. 17, 2024

Related U.S. Application Data

(63) Continuation of application No. PCT/CN2022/134375, filed on Nov. 25, 2022.

(30) Foreign Application Priority Data

Dec. 28, 2021 (CN) ......................... 202111623506.4

(51) Int. Cl.
*H04L 41/12* (2022.01)
*H04L 45/02* (2022.01)

(52) U.S. Cl.
CPC .............. *H04L 41/12* (2013.01); *H04L 45/02* (2013.01)

(58) Field of Classification Search
CPC ... H04L 41/12; H04L 41/046; H04L 41/0853; H04L 45/02; H04L 41/145; H04L 41/22
See application file for complete search history.

(56) References Cited

U.S. PATENT DOCUMENTS

| | | | | |
|---|---|---|---|---|
| 8,805,982 B1 * | 8/2014 | Wilsey | H04L 45/02 370/254 |
| 2005/0083854 A1 * | 4/2005 | Nagarajrao | H04L 41/046 370/254 |
| 2013/0318243 A1 * | 11/2013 | Chinthalapati | H04L 45/52 709/226 |

FOREIGN PATENT DOCUMENTS

| | | |
|---|---|---|
| CN | 105721318 A | 6/2016 |
| CN | 112039693 A | 12/2020 |
| WO | 2007076621 A1 | 7/2007 |

OTHER PUBLICATIONS

Nehra et al., SLDP: A secure and lightweight link discovery protocol for software defined networking, 2019, Computer Networks, vol. 150, p. 102-116 (Year: 2019).*

(Continued)

*Primary Examiner* — Tonia L Dollinger
*Assistant Examiner* — Joseph M Cousins

(57) ABSTRACT

A network system, a network packet processing method and apparatus, and a storage medium are disclosed. The network system includes a controller, a network device, and a terminal device. The terminal device is configured to: when the terminal device accesses a network, send a first packet to a network device connected to the terminal device. The network device is configured to: in response to the first packet sent by the terminal device, mark a connection type of a port connected to the terminal device as a first type; and in response to a topology query request sent by the controller, send a topology query response to the controller, where the topology query response includes an identifier or port information of the network device. According to embodiments of this application, the performance of network topology discovery can be improved.

15 Claims, 6 Drawing Sheets

(56) References Cited

OTHER PUBLICATIONS

Suleman Khan et al, "Topology Discovery in Software Defined Networks: Threats, Taxonomy, and State-of-the-Art", XP011641660, IEEE Communications SurveysandTutorials, vol. 19, Nofirst Quarter 2017, total 22 pages.
Ajay Nehra et al, "SLDP: A secure and lightweight link discovery protocol for softwaredefined networking", XP085592653, Available online Dec. 25, 2018, total 15 pages.
International Search Report and Written Opinion issued in PCT/CN2022/134375, dated Feb. 8, 2023, 7 pages.

* cited by examiner

NETWORK TOPOLOGY DISCOVERY SYSTEM, METHOD, APPARATUS, AND STORAGE MEDIUM

CROSS-REFERENCE TO RELATED APPLICATIONS

This application is a continuation of International Application No. PCT/CN2022/134375, filed on Nov. 25, 2022, which claims priority to Chinese Patent Application No. 202111623506.4, filed on Dec. 28, 2021. The disclosures of the aforementioned applications are hereby incorporated by reference in their entireties.

TECHNICAL FIELD

This application relates to the field of network technologies, and in particular, to a network system, a network packet processing method and apparatus, and a storage medium.

BACKGROUND

Network management refers to management and maintenance of a large-scale computer network, a telecommunication network, and the like. For example, network planning, fault management, and route management are usually performed by using a network management system (NMS). Network topology information is the basis of network management.

In conventional technologies, when network topology discovery is performed, a network management system generally needs to establish connections and communicate with all devices (including network devices and terminal devices) in a network. However, as the network scale increases, the performance of network topology discovery declines.

SUMMARY

In view of this, a network system, a network packet processing method and apparatus, and a storage medium are provided.

According to a first aspect, an embodiment of this application provides a network system. The network system includes a controller, a network device, and a terminal device. The terminal device is configured to: when the terminal device accesses a network, send a first packet to a network device connected to the terminal device. The network device is configured to: in response to the first packet sent by the terminal device, mark a connection type of a port connected to the terminal device as a first type; and in response to a topology query request sent by the controller, send a topology query response to the controller, where the topology query response includes an identifier or port information of the network device. The controller is configured to: send the topology query request to the network device; and generate a network topology diagram based on the topology query response.

In the network system in this embodiment, when accessing the network, the terminal device actively sends the first packet to the network device connected to the terminal device. The network device marks the connection type of the port connected to the terminal device as the first type in response to the first packet. When performing network topology discovery, the controller sends the topology query request to the network device, and the network device sends the topology query response to the controller in response to the topology query request. The topology query response includes the identifier or the port information of the network device. The controller generates the network topology diagram based on the topology query response. In this manner, the network device can mark the connection type of the port connected to the terminal device as the first type based on the first packet actively reported by the terminal device. In this way, when performing the network topology discovery, the controller can establish a connection and communicate with only the network device, but not establish a connection and communicate with the terminal device. Therefore, network topology discovery performance is improved.

According to the first aspect, in a first possible implementation of the network system, the port information includes a quantity of ports of the network device and a connection type of each port.

In this embodiment, the port information of the network device includes the quantity of ports of the network device and the connection type of each port, so that in a network topology discovery process, the topology query request is sent based on the quantity of ports of the network device and the connection type of each port. Therefore, the performance of network topology discovery can be improved.

According to the first aspect or the first possible implementation of the first aspect, in a second possible implementation of the network system, the sending the topology query request to the network device includes: sending the topology query request to a first-level network device; and in response to a topology query response sent by an $i^{th}$-level network device, determining, based on port information in the topology query response, whether a connection type of a port of the $i^{th}$-level network device is the first type, where i is a positive integer.

In this embodiment, when performing the network topology discovery, the controller may send the topology query request to the first-level network device, and in response to the topology query response sent by the $i^{th}$-level network device, determine, based on the port information in the topology query response, whether the connection type of the port of the $i^{th}$-level network device is the first type. In this manner, the controller can determine, by determining whether the connection type of the port is the first type, whether a device connected to the port is the terminal device.

According to the second possible implementation of the first aspect, in a third possible implementation of the network system, the sending the topology query request to the network device includes: if the connection type of the port is not the first type, sending the topology query request to an $(i+1)^{th}$-level network device connected to the port.

In this embodiment, if the connection type of the port of the $i^{th}$-level network device is not the first type, the controller sends the topology query request to the $(i+1)^{th}$-level network device connected to the port. In this manner, the controller can discover the network device in the network system hop by hop and obtain the identifier and the port information of the network device.

According to the second possible implementation of the first aspect, in a third possible implementation of the network system, the controller is configured to: if the connection type of the port is the first type, skip sending the topology query request.

In this embodiment, if the connection type of the port of the $i^{th}$-level network device is the first type, the controller does not send the topology query request to the terminal device connected to the port. In this way, when performing the network topology discovery, the controller does not perform topology query on the terminal device. Therefore, the performance of network topology discovery can be improved.

According to a second aspect, an embodiment of this application provides a network packet processing method, applied to a terminal device. The method includes: when the terminal device accesses a network, sending a first packet to a network device connected to the terminal device.

In this embodiment, when accessing the network, the terminal device can actively send the first packet to the network device connected to the terminal device, so that before a controller performs network topology discovery, the network device connected to the terminal device can report connection information of the terminal device serving as a leaf node in advance, to improve network topology discovery performance.

According to a third aspect, an embodiment of this application provides a network packet processing method, applied to a network device. The method includes: in response to a first packet sent by a terminal device, marking a connection type of a port connected to the terminal device as a first type; and in response to a topology query request sent by a controller, sending a topology query response to the controller, where the topology query response includes an identifier or port information of the network device.

In this embodiment, the network device can mark the connection type of the port connected to the terminal device as the first type in response to the first packet sent by the terminal device, so that in a network topology discovery process, the port connected to the terminal device is determined based on the connection type of the port. The network device can further send the topology query response to the controller in response to the topology query request sent by the controller, so that the controller can obtain the identifier or the port information of the network device based on the topology query response. In this manner, the performance of network topology discovery can be improved.

According to the third aspect, in a first possible implementation of the network packet processing method, the port information includes a quantity of ports of the network device and a connection type of each port.

In this embodiment, the port information of the network device includes the quantity of ports of the network device and the connection type of each port, so that in the network topology discovery process, the topology query request is sent based on the quantity of ports of the network device and the connection type of each port. Therefore, the performance of network topology discovery can be improved.

According to a fourth aspect, an embodiment of this application provides a network packet processing method, applied to a controller. The method includes: sending a topology query request to a network device; and generating a network topology diagram based on a topology query response sent by the network device.

In this embodiment, when performing network topology discovery, the controller can send the topology query request to the network device, and generate the network topology diagram based on the topology query response sent by the network device. In this way, when performing the network topology discovery, the controller establishes a connection and communicates with only the network device, but not establishes a connection and communicates with a terminal device. Therefore, network topology discovery performance is improved.

According to the fourth aspect, in a first possible implementation of the network packet processing method, the sending a topology query request to a network device includes: sending the topology query request to a first-level network device; and in response to a topology query response sent by an $i^{th}$-level network device, determining, based on port information in the topology query response, whether a connection type of a port of the $i^{th}$-level network device is a first type, where i is a positive integer.

In this embodiment, when performing the network topology discovery, the controller may send the topology query request to the first-level network device, and in response to the topology query response sent by the $i^{th}$-level network device, determine, based on the port information in the topology query response, whether the connection type of the port of the $i^{th}$-level network device is the first type. In this manner, the controller can determine, by determining whether the connection type of the port is the first type, whether a device connected to the port is the terminal device.

According to the first possible implementation of the fourth aspect, in a second possible implementation of the network packet processing method, the sending a topology query request to a network device includes: if the connection type of the port is not the first type, sending the topology query request to an $(i+1)^{th}$-level network device connected to the port.

In this embodiment, if the connection type of the port of the $i^{th}$-level network device is not the first type, the controller sends the topology query request to the $(i+1)^{th}$-level network device connected to the port. In this manner, the controller can discover the network device in a network system hop by hop and obtain an identifier and the port information of the network device.

According to the first possible implementation of the fourth aspect, in a third possible implementation of the network packet processing method, the method further includes: if the connection type of the port is the first type, skipping sending the topology query request.

In this embodiment, if the connection type of the port of the $i^{th}$-level network device is the first type, the controller does not send the topology query request to the terminal device connected to the port. In this way, when performing the network topology discovery, the controller does not perform topology query on the terminal device. Therefore, the performance of network topology discovery can be improved.

According to a fifth aspect, an embodiment of this application provides a network packet processing apparatus, used in a terminal device. The apparatus includes: a first sending module, configured to: when the terminal device accesses a network, send a first packet to a network device connected to the terminal device.

In this embodiment, when accessing the network, the terminal device can actively send the first packet to the network device connected to the terminal device, so that before a controller performs network topology discovery, the network device connected to the terminal device can report connection information of the terminal device serving as a leaf node in advance, to improve network topology discovery performance.

According to a sixth aspect, an embodiment of this application provides a network packet processing apparatus, used in a network device. The apparatus includes: a marking module, configured to: in response to a first packet sent by a terminal device, mark a connection type of a port connected to the terminal device as a first type; and a second sending module, configured to: in response to a topology query request sent by a controller, send a topology query response to the controller, where the topology query response includes an identifier or port information of the network device.

In this embodiment, the network device can mark the connection type of the port connected to the terminal device as the first type in response to the first packet sent by the terminal device, so that in a network topology discovery process, the port connected to the terminal device is determined based on the connection type of the port. The network device can further send the topology query response to the controller in response to the topology query request sent by the controller, so that the controller can obtain the identifier or the port information of the network device based on the topology query response. In this manner, the performance of network topology discovery can be improved.

According to the sixth aspect, in a first possible implementation of the network packet processing apparatus, the port information includes a quantity of ports of the network device and a connection type of each port.

In this embodiment, the port information of the network device includes the quantity of ports of the network device and the connection type of each port, so that in the network topology discovery process, the topology query request is sent based on the quantity of ports of the network device and the connection type of each port. Therefore, the performance of network topology discovery can be improved.

According to a seventh aspect, an embodiment of this application provides a network packet processing apparatus, used in a controller. The apparatus includes: a third sending module, configured to send a topology query request to a network device; and a generation module, configured to generate a network topology diagram based on a topology query response sent by the network device.

In this embodiment, when performing network topology discovery, the controller can send the topology query request to the network device, and generate the network topology diagram based on the topology query response sent by the network device. In this way, when performing the network topology discovery, the controller establishes a connection and communicates with only the network device, but not establishes a connection and communicates with a terminal device. Therefore, network topology discovery performance is improved.

According to the seventh aspect, in a first possible implementation of the network packet processing apparatus, the third sending module includes: a first request sending submodule, configured to send the topology query request to a first-level network device; and a determining submodule, configured to: in response to a topology query response sent by an $i^{th}$-level network device, determine, based on port information in the topology query response, whether a connection type of a port of the $i^{th}$-level network device is a first type, where i is a positive integer.

In this embodiment, when performing the network topology discovery, the controller may send the topology query request to the first-level network device, and in response to the topology query response sent by the $i^{th}$-level network device, determine, based on the port information in the topology query response, whether the connection type of the port of the $i^{th}$-level network device is the first type. In this manner, the controller can determine, by determining whether the connection type of the port is the first type, whether a device connected to the port is the terminal device.

According to the first possible implementation of the seventh aspect, in a second possible implementation of the network packet processing apparatus, the third sending module includes: a second request sending submodule, configured to: if the connection type of the port is not the first type, send the topology query request to an $(i+1)^{th}$-level network device connected to the port.

In this embodiment, if the connection type of the port of the $i^{th}$-level network device is not the first type, the controller sends the topology query request to the $(i+1)^{th}$-level network device connected to the port. In this manner, the controller can discover the network device in the network system hop by hop and obtain an identifier and the port information of the network device.

According to the first possible implementation of the seventh aspect, in a third possible implementation of the network packet processing apparatus, the apparatus further includes: a stopping module, configured to: if the connection type of the port is the first type, skip sending the topology query request.

In this embodiment, if the connection type of the port of the $i^{th}$-level network device is the first type, the controller does not send the topology query request to the terminal device connected to the port. In this way, when performing the network topology discovery, the controller does not perform topology query on the terminal device. Therefore, the performance of network topology discovery can be improved.

According to an eighth aspect, an embodiment of this application provides a network packet processing apparatus, including: a processor; and a memory configured to store instructions executable by the processor. When executing the instructions, the processor is configured to implement the network packet processing method according to the second aspect, or implement the network packet processing method according to the third aspect or one or more of a plurality of possible implementations of the third aspect, or implement the network packet processing method according to the fourth aspect or one or more of a plurality of possible implementations of the fourth aspect.

In this embodiment, when accessing a network, a terminal device in a network system actively sends a first packet to a network device connected to the terminal device. The network device marks a connection type of a port connected to the terminal device as a first type in response to the first packet. When performing network topology discovery, a controller sends a topology query request to the network device, and the network device sends a topology query response to the controller in response to the topology query request. The topology query response includes an identifier or port information of the network device. The controller generates a network topology diagram based on the topology query response. In this manner, the network device can mark the connection type of the port connected to the terminal device as the first type based on the first packet actively reported by the terminal device. In this way, when performing the network topology discovery, the controller can establish a connection and communicate with only the network device, but not establish a connection and communicate with the terminal device. Therefore, network topology discovery performance is improved.

According to a ninth aspect, an embodiment of this application provides a non-volatile computer-readable storage medium, storing computer program instructions. When the computer program instructions are executed by a processor, the network packet processing method according to the second aspect, or the network packet processing method according to the third aspect or one or more of a plurality of possible implementations of the third aspect, or the network packet processing method according to the fourth aspect or one or more of a plurality of possible implementations of the fourth aspect is implemented.

In this embodiment, when accessing a network, a terminal device in a network system actively sends a first packet to a network device connected to the terminal device. The network device marks a connection type of a port connected to the terminal device as a first type in response to the first packet. When performing network topology discovery, a controller sends a topology query request to the network device, and the network device sends a topology query response to the controller in response to the topology query request. The topology query response includes an identifier or port information of the network device. The controller generates a network topology diagram based on the topology query response. In this manner, the network device can mark the connection type of the port connected to the terminal device as the first type based on the first packet actively reported by the terminal device. In this way, when performing the network topology discovery, the controller can establish a connection and communicate with only the network device, but not establish a connection and communicate with the terminal device. Therefore, network topology discovery performance is improved.

According to a tenth aspect, an embodiment of this application provides a computer program product, including computer-readable code or a non-volatile computer-readable storage medium carrying computer-readable code. When the computer-readable code is run in an electronic device, a processor in the electronic device performs the network packet processing method according to the second aspect, or performs the network packet processing method according to the third aspect or one or more of a plurality of possible implementations of the third aspect, or performs the network packet processing method according to the fourth aspect or one or more of a plurality of possible implementations of the fourth aspect.

In this embodiment, when accessing a network, a terminal device in a network system actively sends a first packet to a network device connected to the terminal device. The network device marks a connection type of a port connected to the terminal device as a first type in response to the first packet. When performing network topology discovery, a controller sends a topology query request to the network device, and the network device sends a topology query response to the controller in response to the topology query request. The topology query response includes an identifier or port information of the network device. The controller generates a network topology diagram based on the topology query response. In this manner, the network device can mark the connection type of the port connected to the terminal device as the first type based on the first packet actively reported by the terminal device. In this way, when performing the network topology discovery, the controller can establish a connection and communicate with only the network device, but not establish a connection and communicate with the terminal device. Therefore, network topology discovery performance is improved.

These aspects and other aspects of this application are more concise and more comprehensive in descriptions of the following (a plurality of) embodiments.

BRIEF DESCRIPTION OF DRAWINGS

The accompanying drawings included in this specification and constituting a part of this specification and this specification jointly show example embodiments, features, and aspects of this application, and are intended to explain the principles of this application.

DESCRIPTION OF EMBODIMENTS

Figure 1:
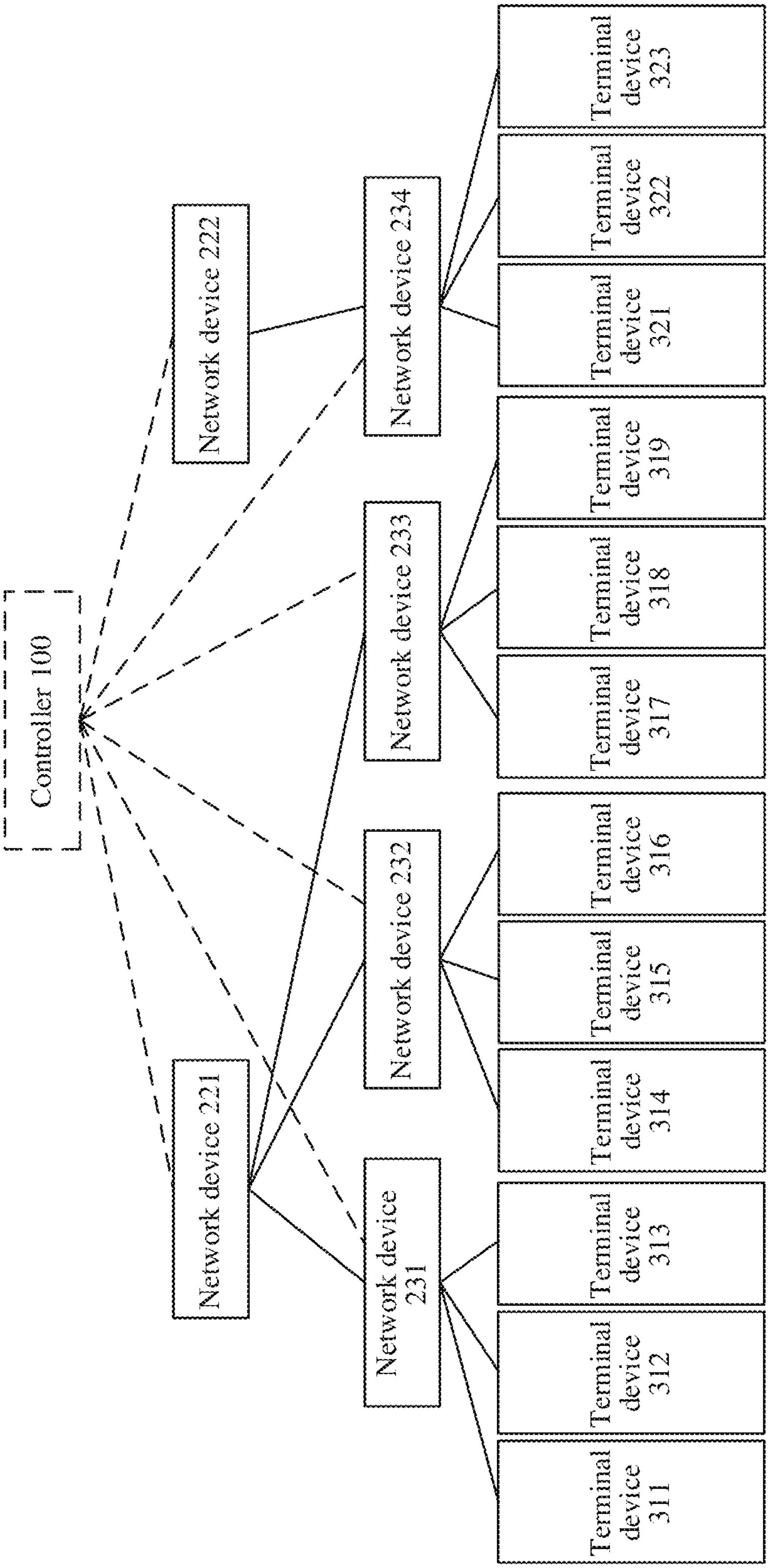
FIG. 1 is a schematic of an example network system according to an embodiment of this application.

The following describes various example embodiments, features, and aspects of this application in detail with reference to the accompanying drawings. Identical reference numerals in the accompanying drawings indicate elements that have same or similar functions. Although various aspects of embodiments are illustrated in the accompanying drawings, the accompanying drawings are not necessarily drawn in proportion unless otherwise specified.

The specific term "example" herein means "used as an example, an embodiment or an illustration". Any embodiment described as "example" is not necessarily explained as being superior or better than other embodiments.

In addition, to better describe this application, numerous specific details are provided in the following specific implementations. A person skilled in the art should understand that this application may also be implemented without some specific details. In some examples, methods, means, elements and circuits that are well-known to a person skilled in the art are not described in detail, so that the subject matter of this application is highlighted.

A purpose of network topology discovery is to obtain and maintain existence information of network nodes and information about connection relationships between the network nodes, and generate a network topology diagram based on the information. A network administrator may perform network management based on the generated network topology diagram by using a network management system, for example, perform network planning, frequency allocation, key distribution authorization, configuration management, performance management, security management, fault management (for example, quickly locating a faulty node), and route management (for example, pre-determining a traffic routing rule to support load balancing).

In conventional technologies, when network topology discovery is performed, the network management system generally needs to establish connections and communicate with all devices (including network devices and terminal devices) in a network. However, when the network scale is large, the performance of network topology discovery is poor.

For example, for a conventional Ethernet (ETH)/Internet protocol (IP)-based network, network topology discovery is mainly performed based on a link layer discovery protocol (LLDP) and a simple network management protocol (SNMP). A specific process of the network topology discovery may be as follows.

After all the devices (including the network devices and the terminal devices) in the network are powered on and started, when data can be received and sent through ports of the devices (that is, the ports are UP), the LLDP protocol is run to discover connection relationships of neighbor ports. When receiving a network topology discovery instruction delivered by the network administrator, the network management system establishes connections with all the devices in the network according to the SNMP protocol, queries neighbor connection relationships of all the devices according to the SNMP protocol, and then summarizes and combines the neighbor connection relationships of all the devices in the network to generate a network topology diagram of the entire network.

Therefore, when the network topology discovery is performed on the conventional ETH/IP-based network, the network management system needs to establish connections with all the devices in the network, and query neighbor connection relationships of all the devices. However, when the network scale is large, the performance of a network topology discovery manner is poor.

A new infiniband (IB)-based network (which may be referred to as an IB network), for example, a low-latency and high-bandwidth dedicated computing network in a field such as scientific computing or massive data processing, generally includes a subnet manager (SM), a network device (for example, a switch or a router), and a terminal device installed with a host channel adapter (HCA). The SM is responsible for discovering, configuring, activating, and managing an entire subnet, and may be located on any node in the subnet.

When the network topology discovery is performed on the IB network, the SM establishes connections and communicates with subnet manager agents (SMAs) deployed on all the devices (including the network devices and the terminal devices) through a subnet manager interface (SMI), for example, sends a management packet to collect topology information of the entire subnet, and then generates a network topology diagram of the entire subnet based on the collected topology information.

However, when the network topology discovery is performed on the IB network in this manner, the SM also needs to establish connections and communicate with all the devices in the subnet, and collect topology information by traversing all the devices in the subnet. When a network scale is large, performance of a network topology discovery manner is poor.

To resolve the foregoing technical problems, this application provides a network system. The network system includes a controller, a network device, and a terminal device. The terminal device is configured to: when the terminal device accesses a network, send a first packet to a network device connected to the terminal device. The network device is configured to: in response to the first packet sent by the terminal device, mark a connection type of a port connected to the terminal device as a first type; and in response to a topology query request sent by the controller, send a topology query response to the controller, where the topology query response includes an identifier or port information of the network device. The controller is configured to: send the topology query request to the network device; and generate a network topology diagram based on the topology query response.

In the network system in embodiments of this application, when accessing the network, the terminal device actively sends the first packet to the network device connected to the terminal device. The network device marks the connection type of the port connected to the terminal device as the first type in response to the first packet. When performing network topology discovery, the controller sends the topology query request to the network device, and the network device sends the topology query response to the controller in response to the topology query request. The topology query response includes the identifier or the port information of the network device. The controller generates the network topology diagram based on the topology query response. In this manner, the network device can mark the connection type of the port connected to the terminal device as the first type based on the first packet actively reported by the terminal device. In this way, when performing the network topology discovery, the controller can establish a connection and communicate with only the network device, but not establish a connection and communicate with the terminal device. Therefore, the performance of network topology discovery can be improved.

A type of the network system in embodiments of this application may be a conventional ETH/IP-based network, an IB network, or another type of network. A specific type of the network system is not limited in this application.

FIG. 1 is a schematic of an example network system according to an embodiment of this application. As shown in FIG. 1, the network system includes one controller 100, six network devices, and 12 terminal devices.

The six network devices are respectively a network device 221, a network device 222, a network device 231, a network device 232, and a network device 233 that are physically connected to the network device 221 (as shown by a solid line in FIG. 1), and a network device 234 physically connected to the network device 222.

The 12 terminal devices are respectively a terminal device 311, a terminal device 312, and a terminal device 313 that are physically connected to the network device 231, a terminal device 314, a terminal device 315, and a terminal device 316 that are physically connected to the network device 232, a terminal device 317, a terminal device 318, and a terminal device 319 that are physically connected to the network device 233, and a terminal device 321, a terminal device 322, and a terminal device 323 that are physically connected to the network device 234.

The controller 100 may be considered as a centralized control unit of a network. The controller 100 may establish connections (where the connections are logical connections, as shown by dashed lines in FIG. 1) with all network devices in the network, but does not establish connections with the terminal devices.

The controller 100 may be implemented by using hardware, or may be implemented by using software. The controller may be deployed on a dedicated network management device, or may be deployed on any network device or any terminal device in the network system. The controller 100 shown in FIG. 1 is implemented by using software, and is deployed on the dedicated network management device (not shown in the figure). It should be noted that a person skilled in the art may determine an implementation and a deployment location of the controller 100 based on an actual situation. This is not limited in this application.

The network device may be, for example, a switch, a router, or another network device. A specific type of the network device is not limited in this application.

The terminal device may be, for example, a server, a mobile phone, a foldable electronic device, a tablet computer, a desktop computer, a laptop computer, a handheld computer, a notebook computer, an ultra-mobile personal computer (UMPC), a netbook, a cellular phone, a personal digital assistant (PDA), an augmented reality (AR) device, a virtual reality (VR) device, an artificial intelligence (AI) device, a wearable device, an in-vehicle device, a smart home device, or a smart city device. A specific type of the terminal device is not limited in this application.

It should be noted that, in FIG. 1, only the network system including the six network devices and the 12 terminal devices is used as an example to describe the network system in this embodiment. A person skilled in the art should understand that in actual application, there may be another quantity of network devices and another quantity of terminal devices in the network system. A specific quantity of network devices and a specific quantity of terminal devices in the network system are not limited in this application.

Only the network system in a tree structure is used as an example in FIG. 1 to illustratively describe the network system in this embodiment. A structure of the network system in this embodiment may alternatively be a star structure, a ring structure, a bus structure, or another structure. This is not limited in this application either.

In a possible implementation, when the terminal device in the network system accesses a network, in other words, when the terminal device is powered on and started to perform data receiving and sending with the connected network device (which may also be considered as when a port of the terminal device is up), the terminal device may send a first packet to the network device connected to the terminal device. For example, when a port of the terminal device 311 in FIG. 1 is up, the terminal device 311 may send the first packet to the network device 231 connected to the terminal device 311.

The first packet may include connection information notifying the network device that a device connected to the corresponding port is the terminal device. In a possible implementation, the first packet may be a packet specially used to send the connection information in the network system, or may be an existing packet that can carry the connection information.

For example, it is assumed that a second packet is an existing packet in the network system. The terminal device sends the second packet to the network device after the port of the terminal device is up. The second packet includes a customized field, and a field indicating the foregoing connection information may be added to the customized field of the second packet, so that the second packet can carry the foregoing connection information. The second packet that can carry the foregoing connection information may be considered as the first packet. In this way, information exchange in a network topology discovery process can be reduced, and the performance of network topology discovery can be improved.

In this manner, when accessing the network, the terminal device can actively send the first packet to the network device connected to the terminal device, so that, before the controller performs the network topology discovery, the network device connected to the terminal device can report the connection information of the terminal device serving as a leaf node in advance, to improve the performance of network topology discovery.

In a possible implementation, in response to the first packet sent by the terminal device, in other words, when receiving the first packet sent by the terminal device, the network device in the network system may mark a connection type of a port (that is, a port for receiving the first packet) connected to the terminal device as a first type.

For example, when the port of the terminal device 311 in FIG. 1 is up, the terminal device 311 may send the first packet to the network device 231 connected to the terminal device 311. When receiving the first packet sent by the terminal device 311, the network device 231 may mark the connection type of the port connected to the terminal device 311 as the first type.

The first type may indicate that a peer device connected to the port of the network device is the terminal device. In a possible implementation, a connection type of the port of the network device may include the first type of the port connected to the terminal device, and may further include a second type. The second type may indicate a connection type other than the first type. For example, a connection type of a port connected to another network device may be marked as the second type. It should be noted that a person skilled in the art may set a connection type other than the first type based on an actual situation. This is not limited in this application.

In this manner, the network device can mark the connection type of the port connected to the terminal device as the first type in response to the first packet sent by the terminal device, so that in a network topology discovery process, the port connected to the terminal device is determined based on the connection type of the port. Therefore, the performance of network topology discovery can be improved.

In a possible implementation, when receiving a network topology discovery instruction, the controller in the network system starts a network topology discovery process (that is, starts to perform network topology discovery). The network topology discovery instruction may be delivered by a network administrator or another person having permission. This is not limited in this application.

In a possible implementation, when performing network topology discovery, the controller may send a topology query request to the network device; and the network device sends a topology query response to the controller in response to the topology query request sent by the controller, where the topology query response includes an identifier or port information of the network device.

For example, when performing the network topology discovery, the controller may send the topology query request hop by hop in a breadth-first traversal manner: The controller may first send the topology query request to a first-level network device. The first-level network device may be a network device directly connected to the controller. In the network system shown in FIG. 1, the first-level network device includes the network device 221 and the network device 222. When performing the network topology discovery, the controller 100 may first send the topology query request to the network device 221 and the network device 222.

When receiving the topology query request sent by the controller, the first-level network device may obtain an identifier (used to uniquely identify the network device in the network system) of the first-level network device, and determine port information of the first-level network device. The network device may obtain the identifier of the first-level network device by using an existing conventional technology. This is not limited in this application. The port information of the network device may include a quantity of ports of the network device and a connection type of each port. The connection type of each port may be the first type or the second type.

For example, it is assumed that the network device 221 in the network system shown in FIG. 1 includes four ports: a port A1, a port A2, a port A3, and a port A4. The port A1 is connected to a previous level device (that is, a device on which the controller 100 is deployed), and is configured to receive the topology query request, send the topology query response, and the like. A connection type of the port A1 is the second type. The port A2, the port A3, and the port A4 are respectively connected to a next level network device (the network device 231, the network device 232, and the network device 233). Connection types of the port A2, the port A3, and the port A4 are also the second type.

For another example, it is assumed that the network device 231 in the network system shown in FIG. 1 includes four ports: a port B1, a port B2, a port B3, and a port B4. The port B1 is connected to the previous level network device 221, and is configured to receive the topology query request, send the topology query response, and the like. A connection type of the port B1 is the second type. The port B2, the port B3, and the port B4 are respectively connected to the terminal device 311, the terminal device 312, and the terminal device 313. Connection types of the port B2, the port B3, and the port B4 are the first type.

It should be noted that the port information may further include other information such as a total quantity of ports, a data transmission rate (that is, a port rate) of each port, and a port state. A person skilled in the art may set specific content of the port information based on an actual situation. This is not limited in this application.

After determining the identifier and the port information of the first-level network device, the first-level network device may encapsulate the identifier and the port information of the first-level network device according to a preset communication protocol, generate a topology query response, and send the topology query response to the controller.

When receiving the topology query response sent by the first-level network device, the controller may parse the topology query response according to the preset communication protocol, and determine the identifier and the port information of the first-level network device from a parsed topology query response.

The controller may determine, based on the port information of the first-level network device, whether the connection type of each port of the first-level network device is the first type. If the connection type of the port of the first-level network device is not the first type, the topology query request is sent to a second-level network device connected to the port. If the connection type of the port of the first-level network device is the first type, the topology query request is not sent to a terminal device connected to the port.

For example, in the network system shown in FIG. 1, the controller may separately determine, based on port information of the first-level network device 221, whether a connection type of each port (the port A1, the port A2, the port A3, and the port A4) of the network device 221 is the first type.

The controller may determine, through the foregoing determining, that connection types of the four ports of the network device 221 are not the first type. The port A1 is a port for receiving the topology query request. In other words, the port A1 is a port connected to the controller, but not a port connected to the next level (the second-level) network device. The controller does not send the topology query request to the device connected to the port A1. The port A2 is a port connected to the next level network device 231. The controller sends the topology query request to the next level network device 231 connected to the port A2. The port A3 is a port connected to the next level network device 232. The controller sends the topology query request to the next level network device 231 connected to the port A3. The port A4 is a port connected to the next level network device 233. The controller sends the topology query request to the next level network device 233 connected to the port A4.

When receiving the topology query request sent by the controller, the second-level network device may first obtain an identifier and port information of the second-level network device, then encapsulate the identifier and the port information of the second-level network device according to the preset communication protocol, generate a topology query response, and send the topology query response to the controller.

When receiving the topology query response sent by the second-level network device, the controller may parse the topology query response according to the preset communication protocol, and determine the identifier and the port information of the second-level network device from a parsed topology query response; and then may determine, based on the port information of the second-level network device, whether a connection type of each port of the second-level network device is the first type.

If the connection type of the port of the second-level network device is not the first type, the controller sends the topology query request to a third-level network device connected to the port. A specific processing process thereof is the same as the foregoing type.

If the connection type of the port of the second-level network device is the first type, the controller does not send the topology query request to a terminal device connected to the port.

For example, in the network system shown in FIG. 1, the controller may separately determine, based on port information of the second-level network device 231, whether a connection type of each port (the port B1, the port B2, the port B3, and the port B4) of the network device 231 is the first type.

The controller may determine, through the foregoing determining, that in the four ports of the network device 231, the connection type of the port B1 is not the first type, and the connection types of the port B2, the port B3, and the port B4 are all the first type. The port B1 is a port for receiving the topology query request. In other words, the port B1 is a port connected to the previous level (the first-level) network device 221, but not a port connected to the next level (the third-level) network device. The controller does not send the topology query request to the network device 221 connected to the port B1, to reduce repeated queries in a network topology discovery process and improve network topology discovery performance. The port B2 is connected to the terminal device 311, and the connection type of the port B2 is the first type. The controller does not send the topology query request to the terminal device 311 connected to the port B2. The port B3 is connected to the terminal device 312, and the connection type of the port B3 is the first type. The controller does not send the topology query request to the terminal device 312 connected to the port B3. The port B4 is connected to the terminal device 313, and the connection type of the port B4 is the first type. The controller does not send the topology query request to the terminal device 313 connected to the port B4.

By analogy, in response to a topology query response of an $i^{th}$-level network device (where i is a positive integer), the controller may determine, based on port information in the topology query response, whether a connection type of a port of the $i^{th}$-level network device is the first type. If the connection type of the port of the $i^{th}$-level network device is not the first type, the topology query request is sent to an $(i+1)^{th}$-level network device connected to the port. In this manner, the controller can discover the network device in the network system hop by hop and obtain the identifier and the port information of the network device.

If the connection type of the port of the $i^{th}$-level network device is the first type, the controller does not send the topology query request to a terminal device connected to the port. In this way, when performing the network topology discovery, the controller does not perform topology query on the terminal device. Therefore, the performance of network topology discovery can be improved.

In a possible implementation, the controller may generate a network topology diagram based on the topology query response. In the network topology discovery process, the controller may obtain the identifier and the port information of the network device based on the topology query response, and generate the network topology diagram while performing topology query with reference to a query path. When the topology query on network devices at all levels in the network system is completed, the controller may generate a complete network topology diagram of the network system.

Alternatively, when topology query on network devices at all levels in the network system is completed, the controller may establish a connection relationship of the network devices based on port information of all network devices in the network system, and mark each network device based on an identifier, to generate a complete network topology diagram of the network system.

It should be noted that the existing conventional technology may be used when the network topology diagram is generated based on the identifier and the port information of the network device. This is not limited in this application.

In a possible implementation, when generating the network topology diagram, the controller may further show the terminal device in the network system in the network topology diagram based on the connection type of the port in the port information.

Figure 2A:
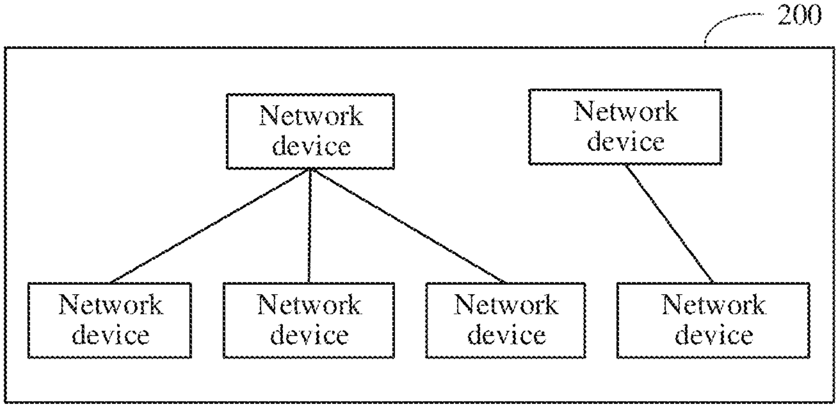
FIG. 2*a* is a schematic of an example network topology diagram according to an embodiment of this application.

FIG. 2*a* is a schematic of an example network topology diagram according to an embodiment of this application. Network topology discovery may be performed on the network system shown in FIG. 1 in the manner described in the foregoing embodiment, to generate the network topology diagram 200 shown in FIG. 2*a*. The network topology diagram 200 shows only network device nodes in the network system.

Figure 2B:
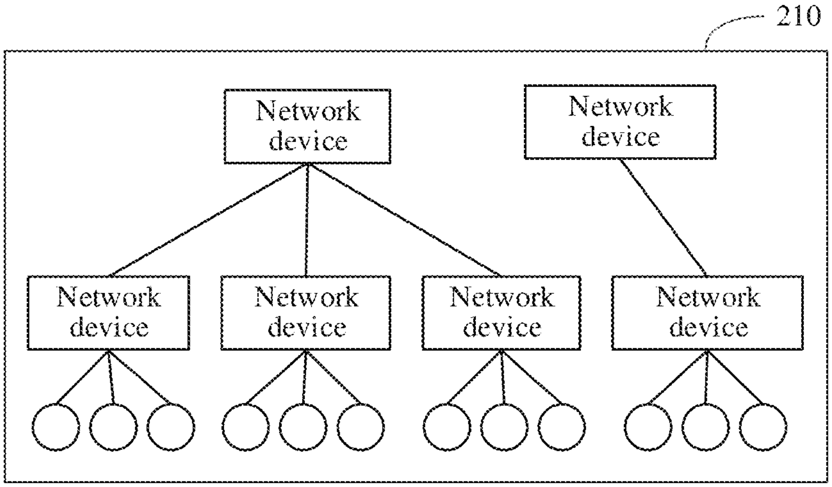
FIG. 2*b* is a schematic of an example network topology diagram according to an embodiment of this application.

FIG. 2*b* is a schematic of an example network topology diagram according to an embodiment of this application. Network topology discovery may be performed on the network system shown in FIG. 1 in the manner described in the foregoing embodiment, to generate the network topology diagram 210 shown in FIG. 2*b*. Compared with the network topology diagram in FIG. 2*a*, in the network topology diagram 210 in FIG. 2*b*, not only network device nodes in the network system are shown, but also terminal devices in the network system, that is, leaf nodes, are shown, which are represented by circular nodes in FIG. 2*b*.

Figure 3:
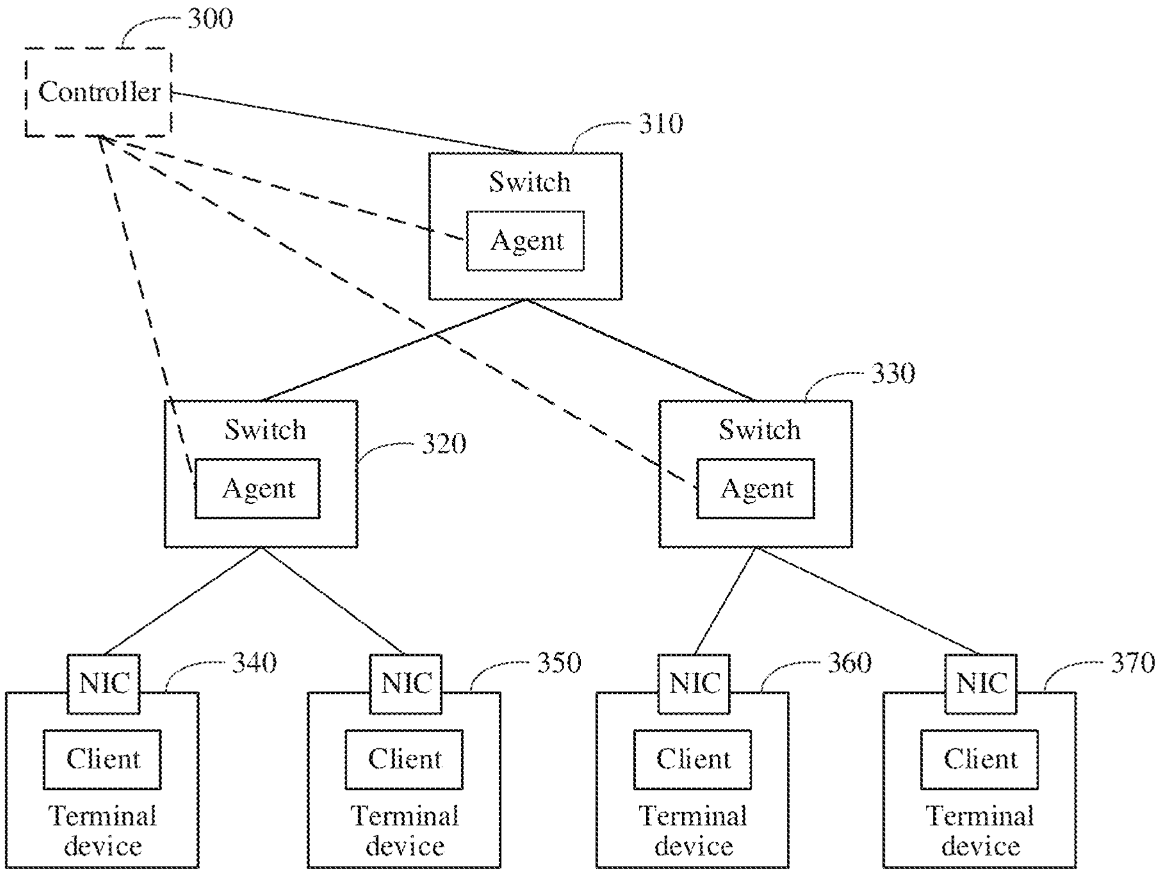
FIG. 3 is a schematic of an example network system according to an embodiment of this application.
Figure 4:
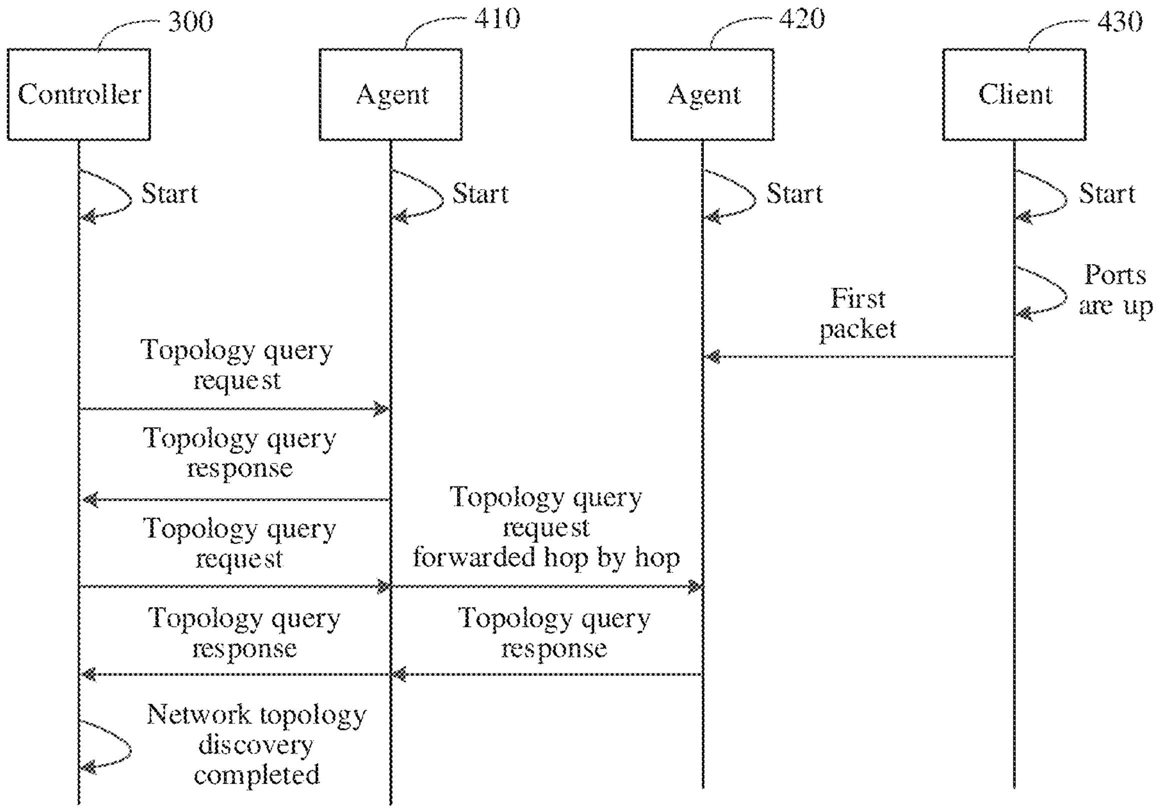
FIG. 4 is a schematic of an example processing process of network topology discovery of a network system according to an embodiment of this application.

The following describes a network topology discovery process of the network system in an embodiment of this application by using an example with reference to FIG. 3 and FIG. 4.

FIG. 3 is a schematic of an example network system according to an embodiment of this application. As shown in FIG. 3, the network system includes a controller 300, a switch 310, a switch 320, and a switch 330 that are used as network devices, and a terminal device 340, a terminal device 350, a terminal device 360, and a terminal device 370. The terminal device herein may be a server or the like. A specific type of the terminal device is not limited in this application.

The controller 300 is physically connected to the switch 310. The switch 310 is physically connected to the switch 320 and the switch 330. The switch 320 is physically connected to a network interface controller (NIC, also referred to as a network adapter, a network interface card, or a local area network adapter) on the terminal device 340. The switch 320 is physically connected to a NIC on the terminal device 350. The switch 330 is physically connected to a NIC on the terminal device 360. The switch 330 is physically connected to a NIC on the terminal device 370. In FIG. 3, a solid line is used to represent the physical connection. The switch 320 and the switch 330 may be top of rack (TOR) switches. The top of rack switch is an access switch located on the top of a rack, and is configured to connect to a terminal device (for example, a server) in the rack. In the network system, the switch 320 and the switch 330 are used as access switches and are connected to terminal devices.

The controller 300 may establish a logical connection to the switch 310. The controller 300 may separately establish a logical connection to the switch 320 and the switch 330 by using the switch 310. In FIG. 3, a dashed line is used to represent the logical connection. The controller 300 may be configured to be responsible for topology management, identity (ID) allocation, ID route management, and the like of the network system.

The network system shown in FIG. 3 may be software-defined networking (SDN). The controller 300 may be a network controller in the SDN. The controller 300 may be deployed on a dedicated network management device, and the network management device is physically connected to the switch 310. It should be noted that, in actual application, the controller 300 may also be deployed on any network device (for example, a switch) or any terminal device in the network system. This is not limited in this application.

In the network system shown in FIG. 3, a network control agent is deployed on each switch. In other words, an agent on the network device in FIG. 3 is a network control agent. A network control client is deployed on each terminal device. In other words, a client on the terminal device in FIG. 3 is a network control client. The network control agent is used as an agent node and has a convergence function. For example, the network control agent on the switch 320 is used as an agent node, and may converge network control client nodes on the terminal device 340 and the terminal device 350 that are accessed by the network control agent. Therefore, workload of the controller 300 is greatly reduced.

It should be noted that, when the network control agent is deployed on the network device, if the network device is a switch, a network control agent is deployed on each switch. If the network device is a router, a network control agent is deployed on each port of each router.

FIG. 4 is a schematic of an example processing process of network topology discovery of a network system according to an embodiment of this application. As shown in FIG. 4, an agent 410 is a network control agent on the switch 310 in FIG. 3. An agent 420 is a network control agent on each of the switch 320 and the switch 330 in FIG. 3. A client 430 is a network control client on each of the terminal device 340, the terminal device 350, the terminal device 360, and the terminal device 370 in FIG. 3.

As shown in FIG. 4, after the controller 300, the agent 410, the agent 420, and the client 430 are started, data may be received and sent through a port (that is, a port is up) that is of the terminal device (such as the terminal device 340, the terminal device 350, the terminal device 360, and the terminal device 370) on which the client 430 is located and that is connected to the switch 320 or the switch 330, then the client 430 actively sends a first packet to the agent 420. The first packet herein may be, for example, an ID application packet carrying connection information (used to notify that a device connected to a corresponding port of a network device is a terminal device), which is used to request a device ID address. The device ID address may be used to uniquely identify a leaf node (that is, the terminal device), and may be used for ID routing. After receiving the first packet (for example, the ID application packet) sent by the client 430, the agent 420 may identify that a peer end is a terminal device, that is, a leaf node, and mark a connection type of a port connected to the terminal device as a first type.

When receiving a network topology discovery instruction sent by a network administrator, the controller 300 may perform network topology discovery hop by hop in a breadth-first traversal manner. Details are as follows.

The controller 300 first sends a topology query request to the agent 410.

After receiving the topology query request, the agent 410 determines an identifier and port information of the switch 310, generates a topology query response based on the identifier and the port information of the switch 310, and then sends the topology query response to the controller 300.

After receiving the topology query response sent by the agent 410, the controller 300 determines whether a connection type of each port of the switch 310 other than a port connected to the controller 300 is the first type. After determining, the controller 300 may determine, among ports of the switch 310, that the connection type of each port other than the port connected to the controller 300 is not the first type.

The controller 300 may send the topology query request to the agent 420 on a next level switch (that is, the switch 320 and the switch 330) connected to the switch 310. The topology query request is forwarded hop by hop to the agent 420 on each of the switch 320 and the switch 330 by using the agent 410.

After receiving the topology query request, the agent 420 separately determines identifiers and port information of the switch 320 and the switch 330, generates corresponding topology query responses based on the identifiers and the port information of the switch 320 and the switch 330, and sends the topology query responses to the controller 300. The topology query responses are forwarded to the controller 300 by using the agent 410.

After receiving the topology query responses, the controller 300 determines whether a connection type of each port of the switch 320 and a connection type of each port of the switch 330 other than a port connected to the switch 310 are the first type. After determining, the controller 300 may determine, among ports of the switch 320 and the switch 330, that the connection type of each port other than the port connected to the switch 310 is the first type. In this case, the controller 300 no longer sends the topology query request to the terminal device on which the client 430 is located.

After receiving the topology query responses sent by the switch 310 on which the agent 410 is located, and the switch 320 and the switch 330 on which the agent 420 is located, the controller 300 may generate the network topology diagram of the network system shown in FIG. 3 based on the topology query responses, to complete network topology discovery.

Figure 5:
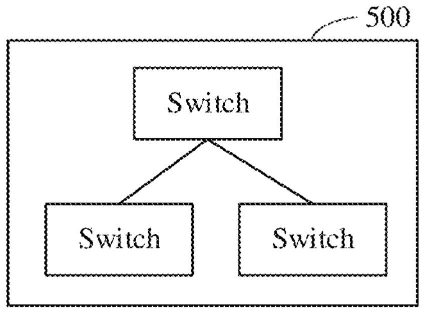
FIG. 5 is a schematic of an example network topology diagram according to an embodiment of this application.

FIG. 5 is a schematic of an example network topology diagram according to an embodiment of this application. Network topology discovery is performed on the network system shown in FIG. 3 in the network topology discovery manner described in the foregoing embodiment, to generate the network topology diagram 500 shown in FIG. 5.

Compared with an existing network topology discovery manner (where a controller or a network management system needs to establish connections with all devices in a network and perform topology query), for the network topology discovery manner in this embodiment, when performing network topology discovery on the network system, the controller only needs to scan (that is, perform topology query) an access network device (for example, an access switch node). For a terminal device that accesses a network device, the controller is neither connected to the terminal device nor scans (that is, performs topology query on) the terminal device. Therefore, the performance of network topology discovery can be greatly improved.

In a possible implementation, an embodiment of this application provides a network packet processing method, applied to a terminal device in a network system. The method includes: when the terminal device accesses a network, sending a first packet to a network device connected to the terminal device.

Figure 6:
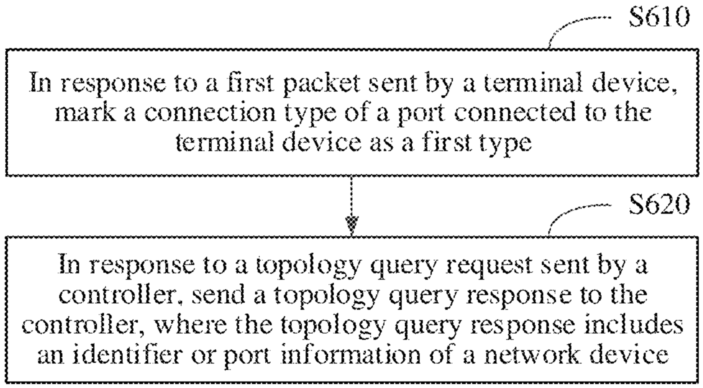
FIG. 6 is a flowchart of an example network packet processing method according to an embodiment of this application.

FIG. 6 is a flowchart of an example network packet processing method according to an embodiment of this application. The network packet processing method is applied to a network device in a network system. As shown in FIG. 6, the network packet processing method includes the following steps.

Step S610: In response to a first packet sent by a terminal device, mark a connection type of a port connected to the terminal device as a first type.

Step S620: In response to a topology query request sent by a controller, send a topology query response to the controller, where the topology query response includes an identifier or port information of the network device.

In a possible implementation, the port information includes a quantity of ports of the network device and a connection type of each port.

Figure 7:
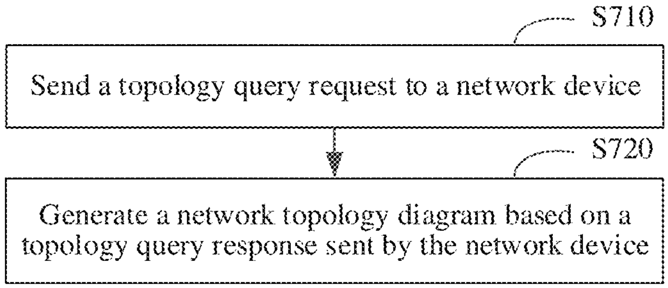
FIG. 7 is a flowchart of an example network packet processing method according to an embodiment of this application.

FIG. 7 is a flowchart of an example network packet processing method according to an embodiment of this application. The network packet processing method is applied to a controller in a network system. As shown in FIG. 7, the network packet processing method includes the following steps.

Step S710: Send a topology query request to a network device.

Step S720: Generate a network topology diagram based on a topology query response sent by the network device.

In a possible implementation, step S710 includes: sending the topology query request to a first-level network device; and in response to the topology query response sent by an $i^{th}$-level network device, determining, based on port information in the topology query response, whether a connection type of a port of the $i^{th}$-level network device is a first type, where i is a positive integer.

In a possible implementation, step S710 includes: if the connection type of the port is not the first type, sending the topology query request to an $(i+1)^{th}$-level network device connected to the port.

In a possible implementation, the method further includes: if the connection type of the port is the first type, skipping sending the topology query request.

Figure 8:
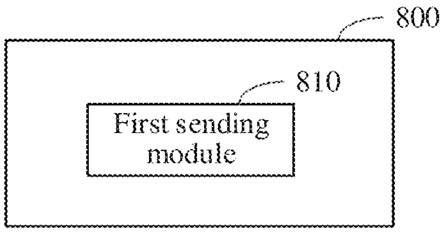
FIG. 8 is a block diagram of an example network packet processing apparatus according to an embodiment of this application.

FIG. 8 is a block diagram of an example network packet processing apparatus according to an embodiment of this application. The network packet processing apparatus is used in a terminal device in a network system. As shown in FIG. 8, the network packet processing apparatus 800 includes:

- a first sending module 810, configured to: when the terminal device accesses a network, send a first packet to a network device connected to the terminal device.

Figure 9:
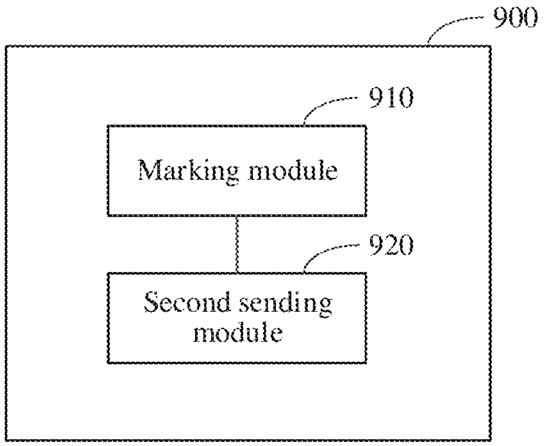
FIG. 9 is a block diagram of an example network packet processing apparatus according to an embodiment of this application.

FIG. 9 is a block diagram of an example network packet processing apparatus according to an embodiment of this application. The network packet processing apparatus is used in a network device in a network system. As shown in FIG. 9, the network packet processing apparatus 900 includes:

- a marking module 910, configured to: in response to a first packet sent by a terminal device, mark a connection type of a port connected to the terminal device as a first type; and
- a second sending module 920, configured to: in response to a topology query request sent by a controller, send a topology query response to the controller, where the topology query response includes an identifier or port information of the network device.

In a possible implementation, the port information includes a quantity of ports of the network device and a connection type of each port.

Figure 10:
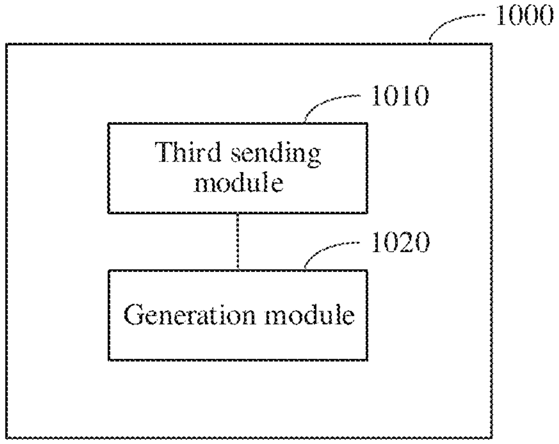
FIG. 10 is a block diagram of an example network packet processing apparatus according to an embodiment of this application.

FIG. 10 is a block diagram of an example network packet processing apparatus according to an embodiment of this application. The network packet processing apparatus is used in a controller in a network system. As shown in FIG. 10, the network packet processing apparatus 1000 includes:

- a third sending module 1010, configured to send a topology query request to a network device; and
- a generation module 1020, configured to generate a network topology diagram based on a topology query response sent by the network device.

In a possible implementation, the third sending module 1010 includes: a first request sending submodule, configured to send the topology query request to a first-level network device; and a determining submodule, configured to: in response to a topology query response sent by an $i^{th}$-level network device, determine, based on port information in the topology query response, whether a connection type of a port of the $i^{th}$-level network device is a first type, where i is a positive integer.

In a possible implementation, the third sending module 1010 includes: a second request sending submodule, configured to: if the connection type of the port is not the first type, send the topology query request to an $(i+1)^{th}$-level network device connected to the port.

In a possible implementation, the network packet processing apparatus 1000 further includes: a stopping module, configured to: if the connection type of the port is the first type, skip sending the topology query request.

An embodiment of this application provides a network packet processing apparatus, including a processor and a memory configured to store instructions executable by the processor. When executing the instructions, the processor is configured to perform the foregoing methods.

An embodiment of this application provides a non-volatile computer-readable storage medium, storing computer program instructions. When the computer program instructions are executed by a processor, the foregoing methods are performed.

An embodiment of this application provides a computer program product, including computer-readable code or a non-volatile computer-readable storage medium carrying computer-readable code. When the computer-readable code runs in a processor of an electronic device, the processor in the electronic device performs the foregoing methods.

The computer-readable storage medium may be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination thereof. More specific examples (non-exhaustive list) of the computer-readable storage medium include: a portable computer disk, a hard disk, a random access memory (RAM), a read-only memory (ROM), an erasable programmable read-only memory (EPROM, or flash memory), a static random-access memory (SRAM), a portable compact disc read-only memory (CD-ROM), a digital video disc (DVD), a memory stick, a floppy disk, a mechanical encoding device, for example, a punched card or a groove protrusion structure that stores instructions, and any suitable combination thereof.

The computer-readable program instructions or code described herein may be downloaded to each computing/processing device from the computer-readable storage medium, or downloaded to an external computer or external storage device via a network, such as the Internet, a local area network, a wide area network and/or a wireless network. The network may include a copper transmission cable, optical fiber transmission, wireless transmission, a router, a firewall, a switch, a gateway computer and/or an edge server. A network adapter card or network interface in each computing/processing device receives the computer-readable program instructions from the network and forwards the computer-readable program instructions for storage in a computer-readable storage medium in each computing/processing device.

The computer program instructions used to perform operations in this application may be assembly instructions, instruction set architecture (ISA) instructions, machine instructions, machine-related instructions, microcode, firmware instructions, state setting data, or source code or object code written in any combination of one or more programming languages. The programming language includes an object-oriented programming language such as Smalltalk and C++, and a conventional procedural programming language such as a "C" language or a similar programming language. The computer-readable program instructions may be entirely executed on a user computer, partially executed on a user computer, executed as an independent software package, partially executed on a user computer and partially executed on a remote computer, or entirely on a remote computer or a server. In a case involving the remote computer, the remote computer may be connected to the user computer through any type of network, including a local area network (LAN) or a wide area network (WAN), or may be connected to an external computer (for example, connected through the Internet by using an internet service provider). In some embodiments, an electronic circuit, for example, a programmable logic circuit, a field-programmable gate array (FPGA), or a programmable logic array (PLA), is customized by using state information of the computer-readable program instructions. The electronic circuit may execute the computer-readable program instructions, to implement various aspects of this application.

The various aspects of this application are described herein with reference to flowcharts and/or block diagrams of the method, the apparatus (system), and the computer program product according to embodiments of this application. It should be understood that each block of the flowcharts and/or the block diagrams and a combination of blocks in the flowcharts and/or the block diagrams may be implemented by the computer-readable program instructions.

These computer-readable program instructions may be provided to a processor of a general-purpose computer, a dedicated computer, or another programmable data processing apparatus to produce a machine, so that when the instructions executed by the processor of the computer or the another programmable data processing apparatus, an apparatus for implementing functions/actions specified in one or more blocks in the flowcharts and/or the block diagrams is created. These computer-readable program instructions may alternatively be stored in the computer-readable storage medium. These instructions enable a computer, a programmable data processing apparatus, and/or another device to work in a specific manner. Therefore, the computer-readable medium storing the instructions includes an artifact that includes instructions for implementing various aspects of functions/actions specified in one or more blocks in the flowcharts and/or the block diagrams.

The computer-readable program instructions may alternatively be loaded onto a computer, another programmable data processing apparatus, or another device, so that a series of operation steps are performed on the computer, the another programmable data processing apparatus, or the another device, to produce a computer-implemented process. Therefore, the instructions executed on the computer, the another programmable data processing apparatus, or the another device implements functions/actions specified in one or more blocks in the flowcharts and/or the block diagrams.

The flowcharts and the block diagrams in the accompanying drawings show possible implementations of system architectures, functions, and operations of apparatuses, systems, methods, and computer program products according to a plurality of embodiments of this application. In this regard, each block in the flowcharts or the block diagrams may represent a module, a program segment, or a part of instructions. The module, the program segment, or the part of the instructions includes one or more executable instructions for implementing a specified logical function. In some alternative implementations, a function indicated in the block may also occur in a sequence different from that indicated in the accompanying drawings. For example, two consecutive blocks may actually be executed substantially in parallel, and may sometimes be executed in a reverse sequence, depending on a function involved.

It should also be noted that each block in the block diagrams and/or the flowcharts, and a combination of blocks in the block diagrams and/or the flowcharts may be implemented by hardware (for example, a circuit or an ASIC (application-specific integrated circuit)) that performs a corresponding function or action, or may be implemented by a combination of hardware and software, for example, firmware.

Although the present invention is described with reference to embodiments, in a process of implementing the present invention that claims protection, a person skilled in the art may understand and implement another variation of the disclosed embodiments by viewing the accompanying drawings, disclosed content, and the appended claims. In the claims, "comprising" does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

The foregoing has described embodiments of this application. The foregoing descriptions are examples, not exhaustive, and are not limited to the disclosed embodiments. Many modifications and variations are apparent to a person of ordinary skill in the technical field without departing from the scope of the described embodiments. The selection of terms used herein is intended to best explain principles of embodiments, practical applications, or improvements to technologies in the market, or to enable another person of ordinary skill in the art to understand embodiments disclosed herein.

What is claimed is:

1. A network system, comprising a controller, a network device, and a terminal device connected to the network device, wherein the terminal device is configured to:

when accessing a network, send a first packet to the network device connected to the terminal device;

the network device is configured to:

in response to the first packet sent by the terminal device, mark a connection type of a port connected to the terminal device as a first type, wherein the first type indicates that a peer device connected to the port of the network device is the terminal device; and in response to a topology query request sent by the controller, send a topology query response to the controller, wherein the topology query response comprises port information of the network device; and the controller is configured to:

send the topology query request to the network device;

generate a network topology diagram based on the topology query response; and determine, based on the port information in the topology query response, that the connection type of the port is the first type and, in response, skip sending the topology query request through the port.

2. The system according to claim 1, wherein the port information comprises a quantity of ports of the network device and a connection type of each of the ports of the network device.

3. The system according to claim 1, wherein the sending of the topology query request to the network device comprises:

sending the topology query request to a first-level network device; and in response to a topology query response sent by an $i^{th}$-level network device, determining, based on port information in the topology query response, whether a connection type of a port of the $i^{th}$-level network device is the first type, wherein i is a positive integer.

4. The system according to claim 3, wherein the sending of the topology query request to the network device comprises:

when the connection type of the port is not the first type, sending the topology query request to an $(i+1)^{th}$-level network device connected to the port.

5. The system according to claim 3, wherein the controller is configured to determine, based on the port information, whether a connection type of each port of the ith-level network device other than a port connected to a previous-level network device or, when the ith-level network device is the first-level network device, the controller is the first type.

6. The system according to claim 1, wherein the first packet comprises connection information indicating that a device connected to the port of the network device is the terminal device.

7. The system according to claim 6, wherein the first packet is an existing packet that carries the connection information in a customized field.

8. The system according to claim 1, wherein the first packet comprises an identifier application packet used to request a device identifier address for uniquely identifying the terminal device as a leaf node.

9. The system according to claim 1, wherein a connection type of each port of the network device is selected from a plurality of connection types comprising the first type and a second type, the second type indicating a connection type other than the first type.

10. A network packet processing method, applied to a controller, wherein the method comprises:

sending a topology query request to a network device; and generating a network topology diagram based on a topology query response sent by the network device, wherein the topology query response comprises port information of the network device, the port information indicates that a connection type of a port of the network device is a first type, and the first type indicates that a peer device connected to the port of the network device is a terminal device, and determining, based on the port information in the topology query response, that the connection type of the port is the first type and, in response, skipping sending the topology query request through the port.

11. The method according to claim 10, wherein the sending of the topology query request to the network device comprises:

sending the topology query request to a first-level network device; and in response to a topology query response sent by an $i^{th}$-level network device, determining, based on port information in the topology query response, whether a connection type of a port of the $i^{th}$-level network device is a first type, wherein i is a positive integer.

12. The method according to claim 11, wherein the sending of the topology query request to the network device comprises:

when the connection type of the port is not the first type, sending the topology query request to an $(i+1)^{th}$-level network device connected to the port.

13. A non-transitory computer program product comprising instructions that are stored on a computer-readable medium and that, when executed by at least one processor, cause an apparatus to perform operations comprising:

sending a topology query request to a network device;

generating a network topology diagram based on a topology query response sent by the network device, wherein the topology query response comprises port information of the network device, the port information indicates that a connection type of a port of the network device is a first type, and the first type indicates that a peer device connected to the port of the network device is a terminal device, and determining, based on the port information in the topology query response, that the connection type of the port is the first type and, in response, skipping sending the topology query request through the port.

14. The computer program product according to claim 13, wherein the sending of the topology query request to the network device comprises:

sending the topology query request to a first-level network device; and in response to a topology query response sent by an $i^{th}$-level network device, determining, based on port information in the topology query response, whether a connection type of a port of the $i^{th}$-level network device is a first type, wherein i is a positive integer.

15. The computer program product according to claim 14, wherein the sending of the topology query request to the network device comprises:

when the connection type of the port is not the first type, sending the topology query request to an $(i+1)^{th}$-level network device connected to the port.

* * * * *